(No Model.)
J. GRIFFIN.
LIGHTNING ARRESTER FOR TELEGRAPH AND TELEPHONE LINES.
No. 296,407.
Patented Apr. 8, 1884.
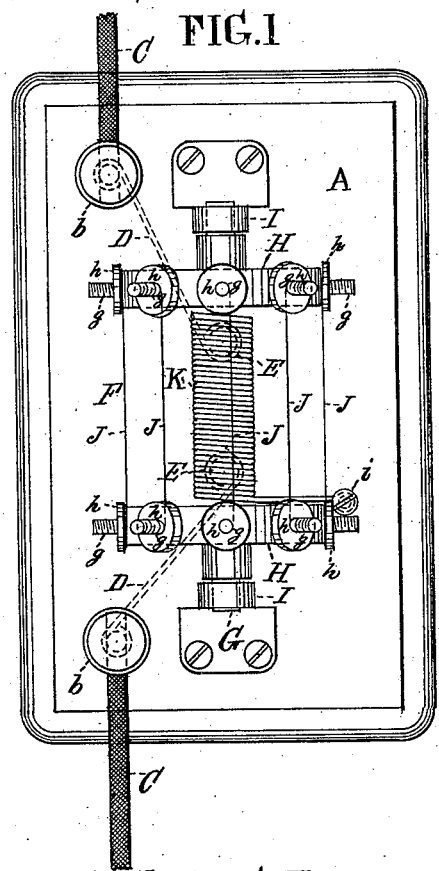
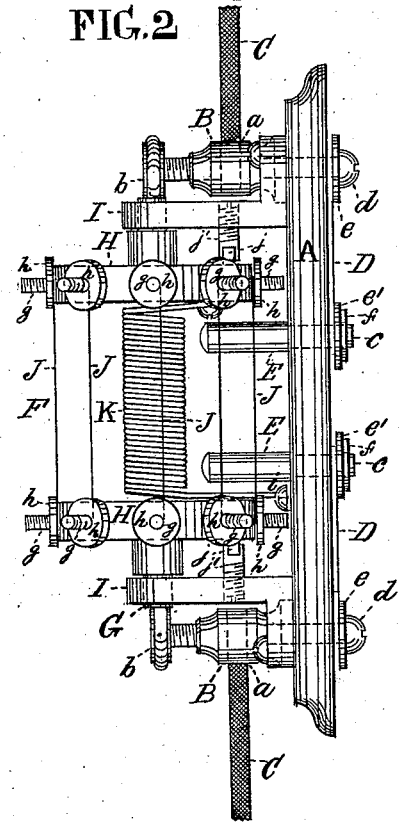
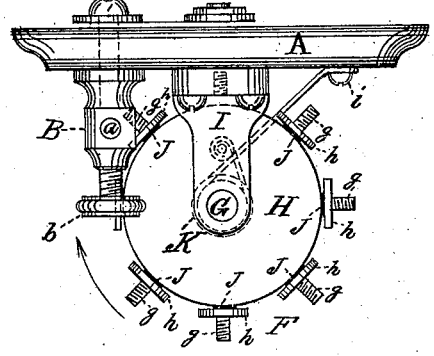
Witnesses
Thomas P. Bewley.
Francis Hoyle
Inventor
John Griffin
per Stephen Ustick att'y

UNITED STATES PATENT OFFICE.

JOHN GRIFFIN, OF PHILADELPHIA, PENNSYLVANIA.

LIGHTNING-ARRESTER FOR TELEGRAPH AND TELEPHONE LINES.

SPECIFICATION forming part of Letters Patent No. 296,407, dated April 8, 1884.

Application filed October 13, 1883. (No model.)

*To all whom it may concern:*

Be it known that I, JOHN GRIFFIN, a subject of the Queen of Great Britain and Ireland, residing at Philadelphia, in the county of Philadelphia and State of Pennsylvania, have invented a new and useful Improvement in Telegraph and Telephone Lightning-Protectors, of which the following is a specification.

I am aware of the lightning-arrester shown in the French Patent No. 64,114, dated August 17, 1864, in which there is a reel having fine wires connected at their ends to brackets of disks at the ends of the reel by means of springs, whereby they are kept taut, the wires consecutively communicating at one end with the incoming line-wire, and at their other end with the outgoing wire to complete the circuit, all the wires being brought together into connection at the incoming end with the line-wire. In the disk which connnets with the line-wire there is embedded a spring-pendulum, which gives an axial movement to the reel at the time a wire is burned, and thereby brings the next wire into connection to restore the circuit.

My invention relates to a reel having a series of fine wires at its periphery and a spiral spring around its central shaft from end to end between the disks, to which the ends of the wires are connected, one end being connected with one of the disks and the other end to the base of the instrument, for giving an axial movement to the reel when a wire is burned by lightning, whereby to restore the connection with the line-wire by means of the next succeeding wire until all are burned.

It also relates to means for the arrangement of the reel for refilling it with wires, as hereinafter fully described.

In the accompanying drawings, which make a part of this specification, Figure 1 is a face view of the protector adapted to be placed with its base against an upright support. Fig. 2 is a side view of the same. Fig. 3 is a top view.

Like letters of reference in all the figures indicate the same parts.

A represents the base of the instrument, with which the several parts are connected. The instrument is adapted to be placed with its base against an upright support, or placed on a table.

B B are binding-posts of the line-wire C, which is connected with the opening $a\,a$ of the posts, and fastened by means of the set-screws $b\,b$. The posts are fastened by screws $d\,d$ and interposed washers $e\,e$, which are held down on one end of the sectional wires D D by means of the screws. The other ends of these wires are connected with the tenons $c\,c$ of the pins E E by means of the washers $e'\,e'$ and nuts $f\,f$. To complete the connection of the line-wire, there is a reel, F, having a shaft, G, and disk-heads H H, the latter being made of hard rubber. The shaft is journaled into the housings I I. There is a series of fine German-silver wires, J, which are stretched taut and confined at their ends to the peripheries of the disks H H by means of the stud screw-stems $g$ and nuts $h$, so as to insulate each conductor separately. The shaft G is provided with the coiled tension-spring K, which surrounds it, and is fastened at one end to one of the disks H and at the other end to the base A by means of the screw $i$. The tension of the spring should be of sufficient strength to carry the reel clearly once around, it being set with one of the wires J in contact with the pins E E, the pins $j$, which project from one side of the disks H H, coming against the screw-stops $j'\,j'$, as seen in Fig. 2. If the tension of the spring K is required to be regulated, it can be done by withdrawing the stop-screws $j'\,j'$ and turning the reel around one or more times, as may be required, to give the requisite tension to the spring and then replacing the screws. The circuit being completed by means of the connection of the reel F with the line-wire, as described, the line is in working order. Then, if the lightning strikes the line-wire, the fine German-silver wire J in contact with the pins E E will be burned, and the connection broken by the burning of said wire J, and by the force of the spring K the reel will be instantly turned partly around until the next wire J is brought into contact with said pins E E, and so on as often as the lightning strikes the line-wire until all the wires J are consumed and the circuit broken. Then to again make the connection the reel must be turned around in a reversed direction until the pins $j\,j$ are brought into contact with the stop-screws $j'\,j'$, and then refilled with wires.

In other lightning-protectors the connection-wire is liable to draw loose from the tightening-screws by the latter working loose; but in my instrument, as the wires J are always kept taut against the pins E E by the action of the spring K, no looseness can occur.

I claim as my invention—

1. In a telegraph and telephone lightning-protector, the combination of the spring K with the reel F, screw-stops $j'\,j'$, and pins $j\,j$, the spring surrounding the shaft G and being confined at one end to a disk, H, of the reel, and at the other end to the base A, substantially in the manner and for the purpose set forth.

2. The combination of the screw-stops $j'\,j'$ and pins $j\,j$ with the disks H H and housings I I, substantially as and for the purpose set forth.

JOHN GRIFFIN.

Witnesses:
   THOMAS J. BEWLEY,
   STEPHEN USTICK.